United States Patent [19]
Jones et al.

[11] Patent Number: 6,078,023
[45] Date of Patent: Jun. 20, 2000

[54] LIQUID-COOLED WELDING TORCH ASSEMBLY

[76] Inventors: Glen A. Jones, P.O. Box 96, Wilmington, Ill. 60481; Richard L. Jones, 452 S. 4th St.; Robert Warning, P.O. Box 383, both of Peotone, Ill. 60468

[21] Appl. No.: 09/067,541

[22] Filed: Apr. 27, 1998

[51] Int. Cl.⁷ .............................. B23K 9/32; B23K 9/12
[52] U.S. Cl. ................................. 219/137.63; 219/137.62
[58] Field of Search ........................ 219/137.62, 137.63, 219/137.9; 174/15.7

[56] References Cited

U.S. PATENT DOCUMENTS

| 4,158,763 | 6/1979 | Moerke | 219/137.62 |
| 4,549,068 | 10/1985 | Kensrue | 219/137.63 |

OTHER PUBLICATIONS

Brochure for Abicor Binzel NTS MIG/MAG Automated Welding System, Published prior to Apr. 27,1998.
Brochure for Abicor Binzel; ATS—Rotor Torch Neck Change System; Published prior to Apr. 27, 1998.
Kepner Products Company, Kepsel Cartridge Installation Tips & Applications, Published prior to Apr. 27, 1998.
Brochure for Bernard®, CustomSelect Semi–Automatic Mig Guns Water–Cooled Semi–automatics, Version 3.0, Published prior to Apr. 27, 1998.
Brochure for Bernard®, CustomSelect Automatics & Robotics Air–Cooled Robotics, Version 1.1, dated 1997.
Brochure for Bernard®Q–Gun Ez Feed MIG Series Welding Torch entitled: Technical Data 500 Amp, Release 1.3, dated 1996.
OCIM Welding Products Brochure entitled Automation: Torches & Accessories; Published prior to Apr. 27,1998.
Alexander Binzel Welding Products, Product Catalog for Robotic MIG/MAG Neck–change, Push–Pull, Welding Torch ROBO WH–PP with Changeable Necks WH–241 and WH–455; Published prior Apr. 27, 1998.
Alexander Binzel Welding Products, Robotic MIG Push–Pull Torch with Changeable Necks for 200 and 400 Amp Applications—ROBO WH–PP, Published prior to Apr. 27, 1998.
Alexander Binzel Welding Products, Robotic MIG Torch with Changeable Necks for 200 and 400 Amp Applications—Robo WH; Published prior to Apr. 27, 1998.
DF Machine Specialitis Inc, Mechanized and Robotic Welding Products Catalog—MIG TIG SAW, Published prior to Apr. 27, 1998; pp. 1–22.
Alexander Binzel Welding Products, Robotic MIG/MAG Neck–change Welding Torch—Robo WH with Changeable Necks WH–241 and WH–455; Published prior to Apr. 27, 1998.
Excerpts from Tweco Robotics Catalog, Quick Tube Robotics Torches & Accessories, Published prior to Apr. 27, 1998.
Tweco QTR Quick Tube Robotics Torches & Accessories Brochure; Dated Jul. 1995.
Alexander Binzel Welding Products Brochure; Binzel Automates Robot Welding with the "BWS" Torch Neck Changing System; Published prior to Apr. 27, 1998.
Alexander Binzel Welding Products, Product Catalog for Robotic MIG/MAG Neck–Change Welding Torch ROBO WH with Changeable Necks WH–241 and WH455, published prior to Apr. 27, 1998.

*Primary Examiner*—Patrick Ryan
*Assistant Examiner*—Anjan Dey
*Attorney, Agent, or Firm*—Brinks Hofer Gilson & Lione

[57] ABSTRACT

A liquid-cooled welding torch assembly for use in robotic welding that includes a body tube with a set of male connectors, the body tube guiding an electrode, and a flow of coolant to a welding tip. A supply cable adapter including a set of female connectors corresponding to the set of male connectors. At least one of the male connectors includes a rigid tube with a plurality of axially compressible and radially expandable sealing members coaxially and slidably disposed about the rigid tube, whereby the plurality of axially compressible and radially expandable sealing members expand to create a seal between the at least one of the male connectors and a corresponding one of the set of female connectors.

30 Claims, 5 Drawing Sheets

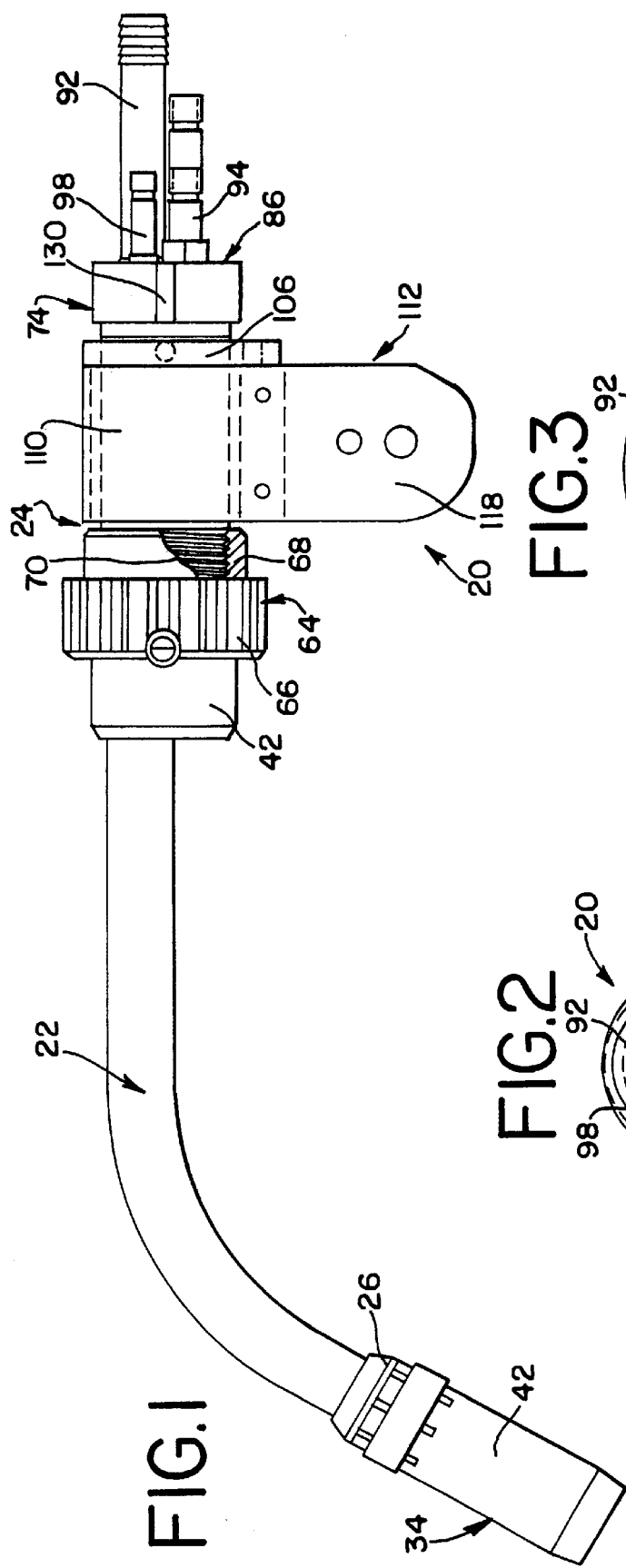
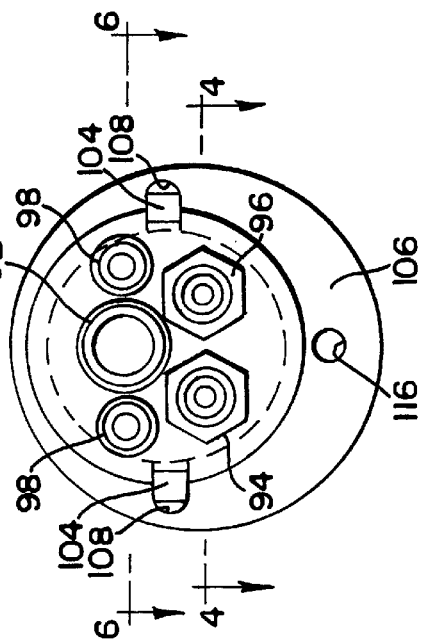
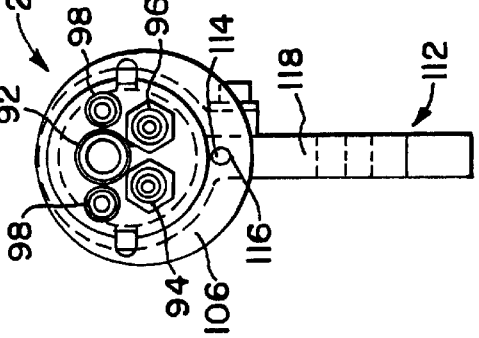

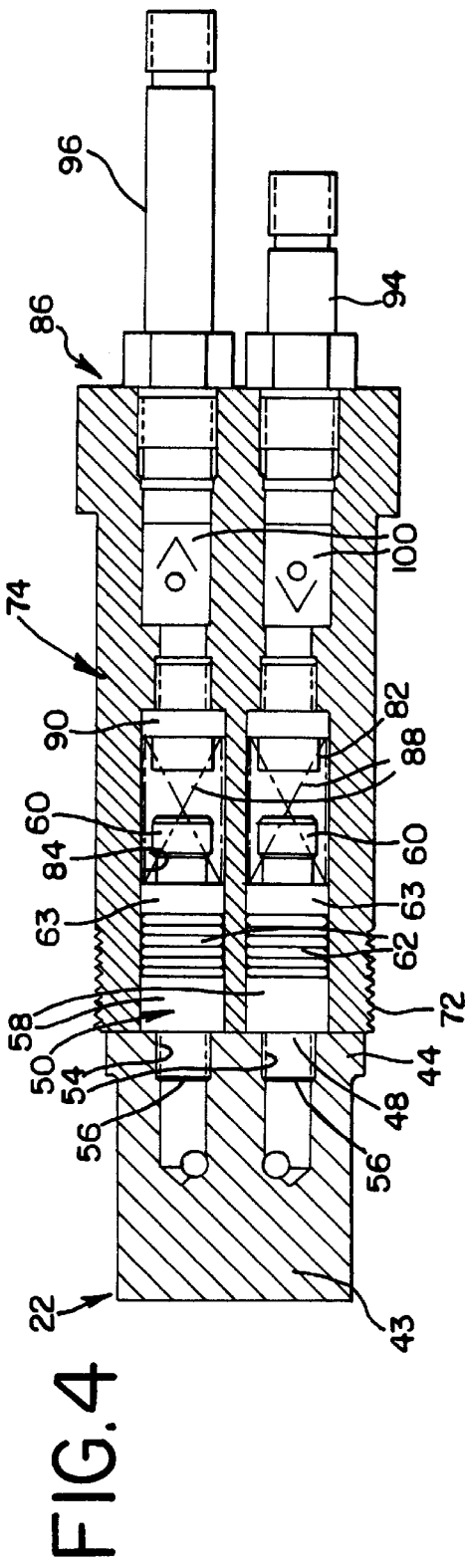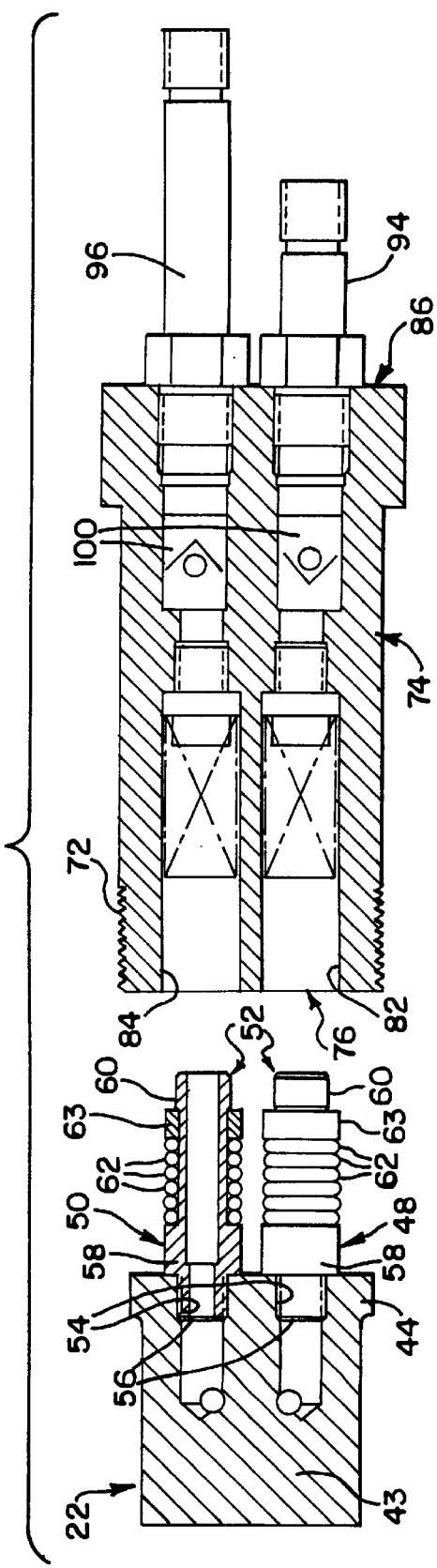

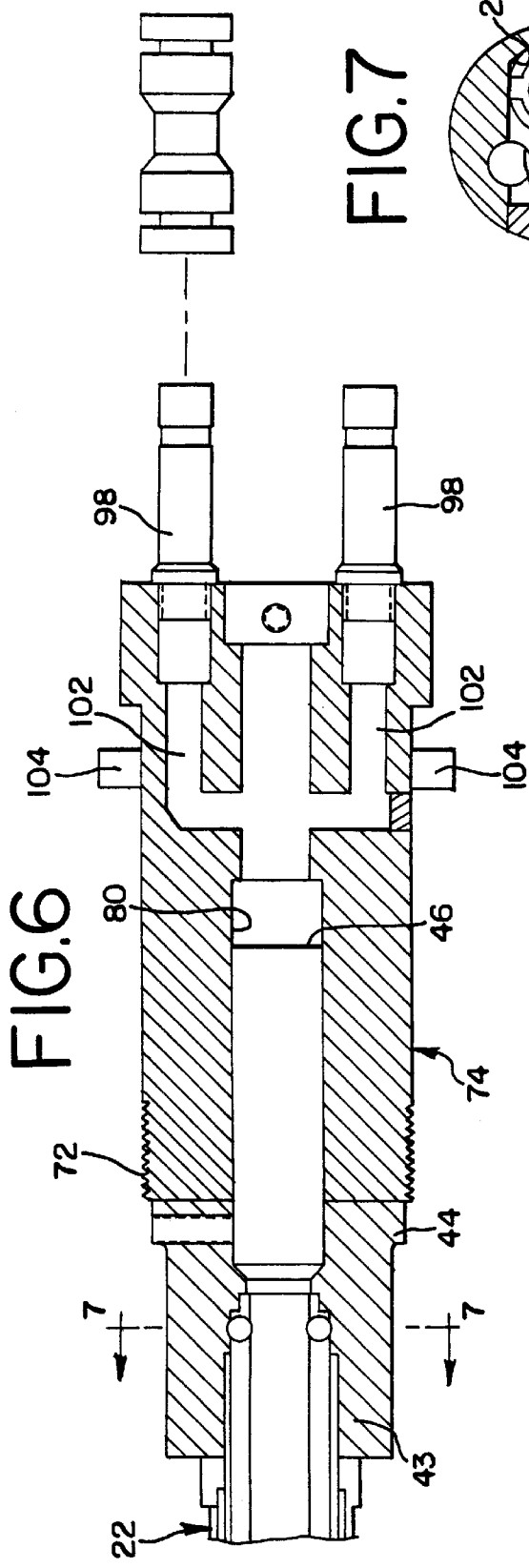
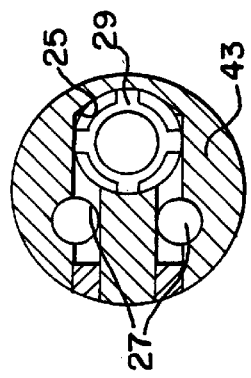
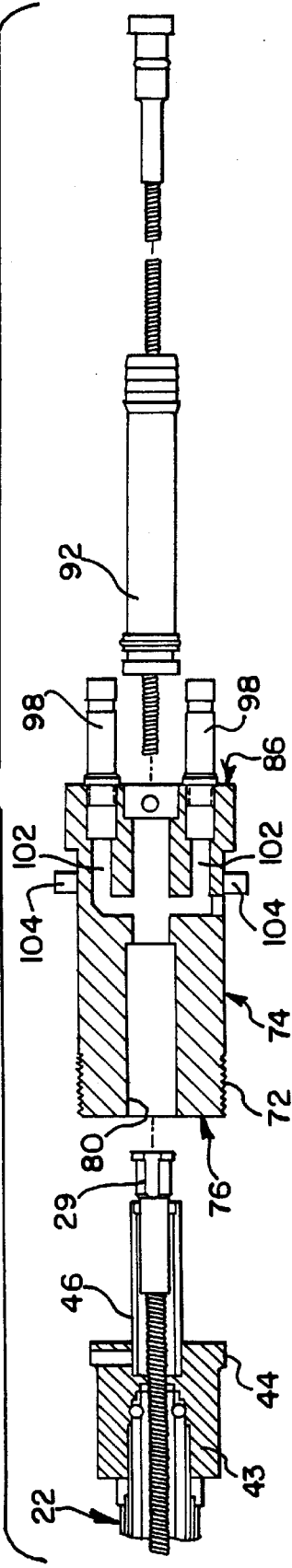

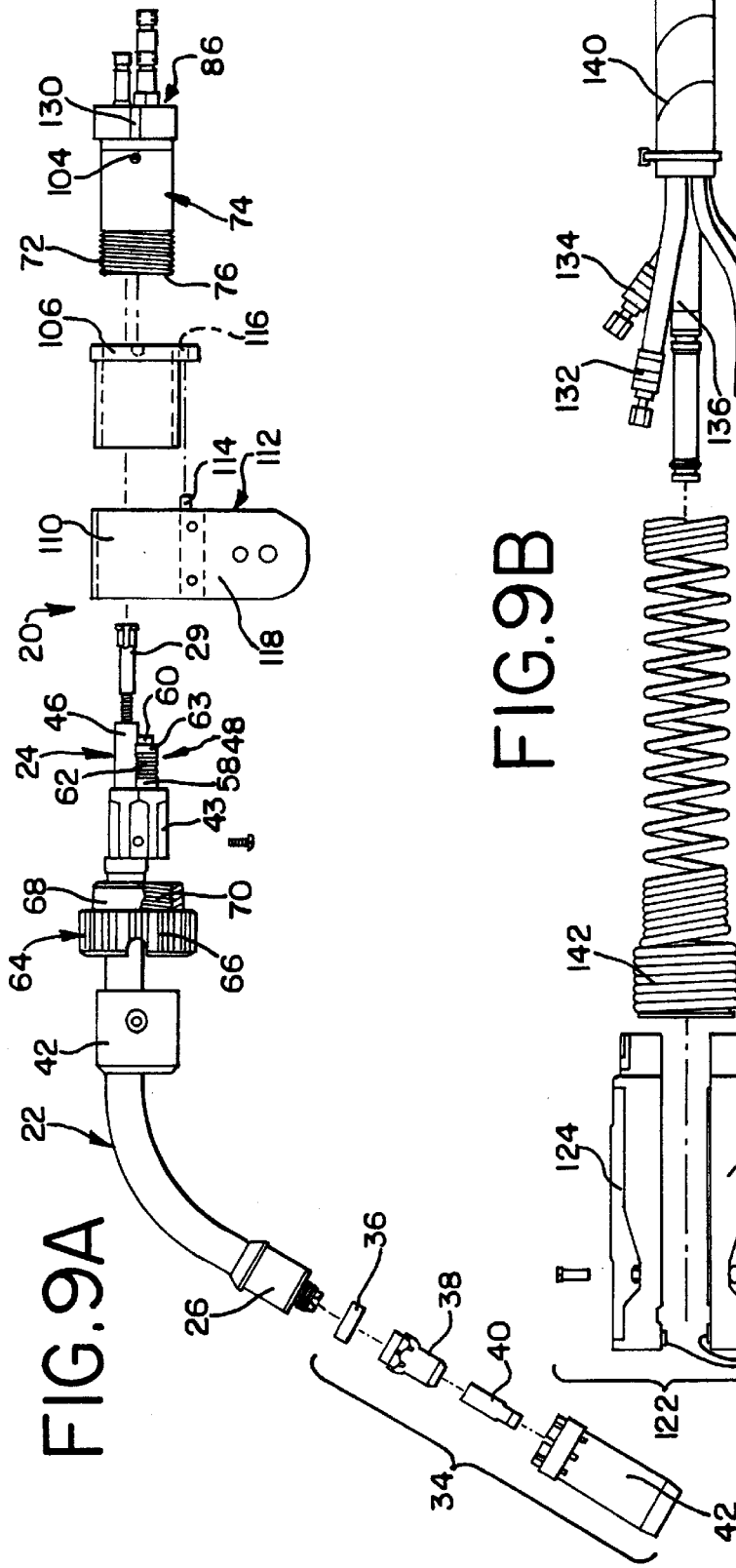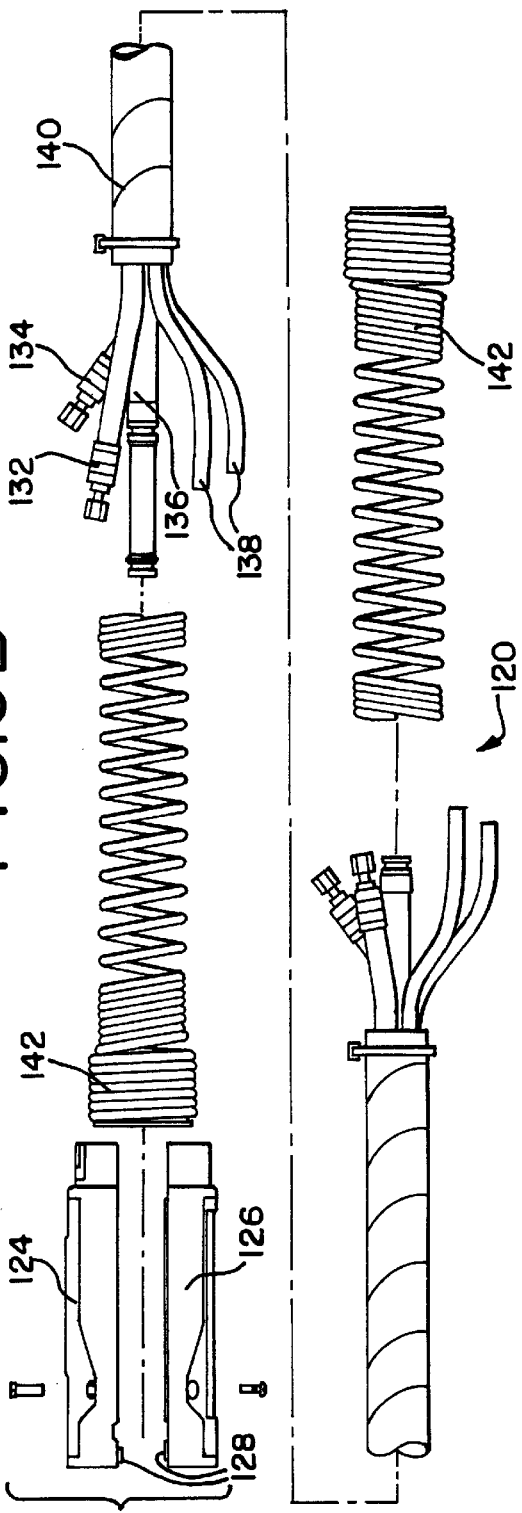

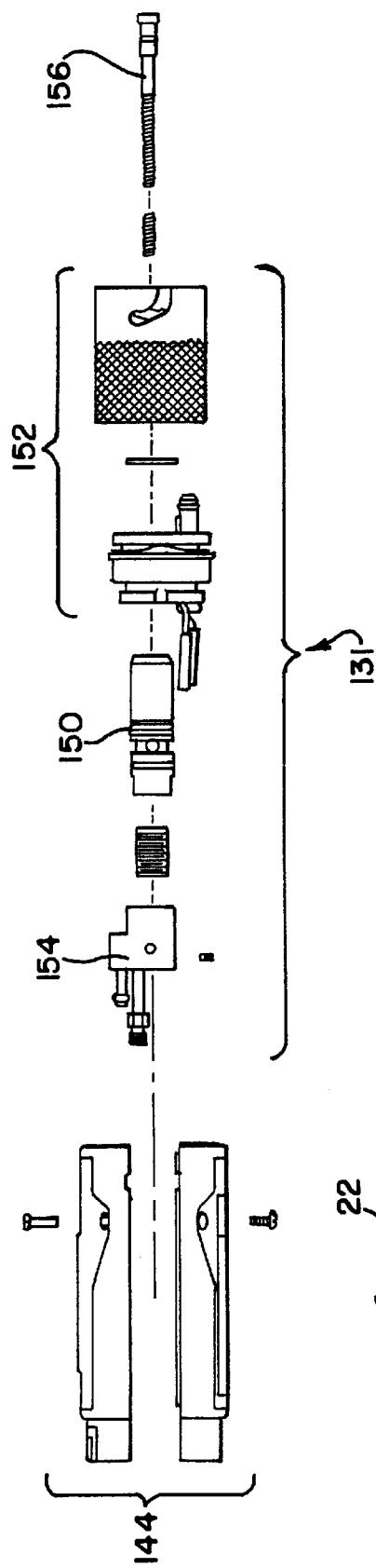
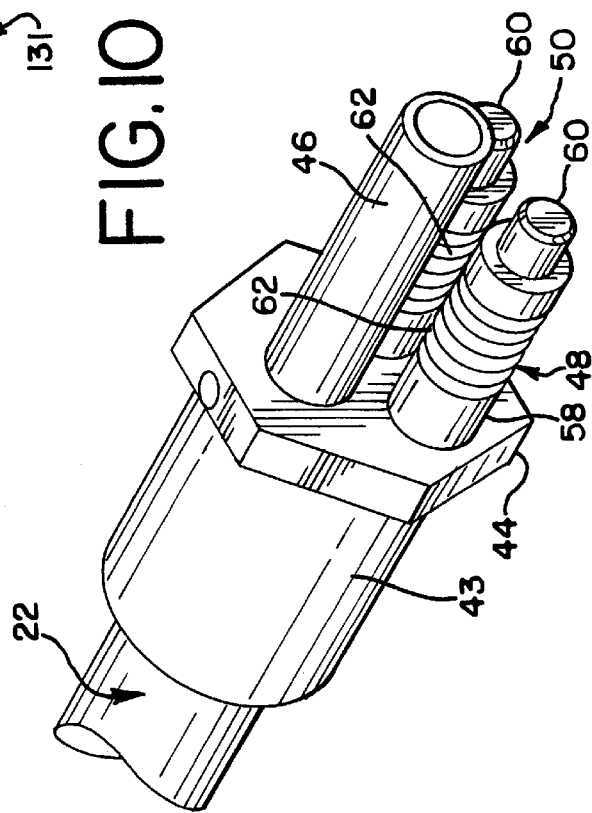
FIG.9C
FIG.10

LIQUID-COOLED WELDING TORCH ASSEMBLY

BACKGROUND OF THE INVENTION

1. Field of Invention

The present invention relates generally to a welding torch assembly. More particularly, the present invention relates to an improved liquid-cooled welding torch assembly for use in robotic welding.

2. Prior Developments

Robotic welding torches are used in arc welding environments requiring repetitious precision welding, such as mass production of automobiles or automotive parts. Arc welding robots are generally high precision, computer controlled machines containing electric servomotor drives. The welding robots use special interfaces to connect with robotic arc welding equipment. The welding robots typically use an articulating jointed arm to move the attached robotic torch assembly to the desired position. Robotic welding is often used for arc welding parts where the production volume and complexity are large. Robotic torches, such as robotic metal inert gas (MIG) torches, utilize consumable wire electrodes fed from a spool in a separate wire feeder. Also, the robotic torches require a supply of shielding gas and electric current to perform the welding tasks.

The rapid and precise welding applications for which robotic MIG welding torches are used require torch assemblies that are easily assembled and repaired. Robotic welding devices may be subject to heat and wear due to continuous operation. Also, accidental collisions between the welding torch and the workpiece being welded can damage the welding torch. Accordingly, it may be necessary to replace one or more parts of the welding torch during its use. However, since liquid-cooled welding torches employ liquid coolant lines, it is necessary that an adequate seal be maintained when the components are reconnected. It is also necessary for coolant to be retained within the coolant system when a liquid-cooled welding torch is disconnected. Liquid-cooled welding torches with removable components typically use seals that are prone to damage and subsequent leakage every time a welding torch is disassembled and reassembled. Furthermore, realignment of the welding torch after replacing one or more components is important so that the welding tip is always where the robot expects it to be during operation.

SUMMARY OF THE INVENTION

One aspect of the present invention regards a liquid-cooled welding torch assembly for use in robotic welding that includes a body tube with a set of male connectors, the body tube guiding an electrode, and a flow of coolant to a welding tip. A supply cable adapter including a set of female connectors corresponding to the set of male connectors is also described. At least one of the male connectors includes a rigid tube with a plurality of axially compressible and radially expandable sealing members coaxially and slidably disposed about the rigid tube, whereby the plurality of axially compressible and radially expandable sealing members expand to create a seal between the at least one of the male connectors and a corresponding one of the set of female connectors.

A second aspect of the present invention regards a liquid-cooled welding torch assembly for use in robotic welding that includes a body tube with a set of male connectors, the body tube guiding an electrode and a flow of coolant to a welding tip. A supply cable adapter including a set of female connectors corresponding to the set of male connectors, wherein at least one of the male connectors includes at least one rigid tube with an axially compressible and radially expandable sealing member coaxially disposed about the rigid tube. The axially compressible and radially expandable sealing member having an axial length and a radial thickness, wherein the axial length is greater than the radial thickness. The axially compressible and radially expandable sealing member creates a seal between the at least one of the male connectors and a corresponding one of the set of female connectors when an axial force is applied to the sealing member.

A third aspect of the present invention relates to a supply cable adapter for use in a liquid-cooled welding torch that includes an adapter member having an axial length and a width, wherein the axial length is greater than the width. A body tube connection end is located on one end of the adapter member and includes a first plurality of female connectors defined by hollow bores in the body tube end of the adapter member. A supply end is located opposite the body tube end and is releasably connectable to a plurality of supply connectors. A threaded area adjacent the body tube connection end and a strain relief orientation guide are positioned adjacent the supply end of the adapter member.

A fourth aspect of the present invention relates to a liquid-cooled welding torch assembly for use in robotic welding that includes a body tube having a set of male connectors, the body tube guiding an electrode, and a flow of coolant to a welding tip. A supply cable adapter has a set of female connectors corresponding to the set of male connectors, the supply cable adapter also has an axial length and a width where the axial length is greater than the width. The body tube releasably connects to the supply cable adapter in a predetermined rotationally fixed orientation. The welding torch assembly also includes a mounting cuff sized to slidably fit over an exterior portion of the axial length of the supply cable adapter. The mounting cuff has an orientation guide adapted to cooperate with a corresponding orientation guide on the supply cable adapter to maintain a predetermined rotationally fixed orientation with respect to the supply cable adapter. A torch mount is slidably connectable to an outer portion of the mounting cuff and includes an alignment guide sized to cooperate with a corresponding alignment guide on the mounting cuff to repeatably connect at a predetermined alignment, so that a repeatable orientation of the body tube is maintained with respect to the torch mount to expedite replacement of the body tube.

The first two aspects of the present invention provide the advantage of allowing a welding torch to be quickly replaced while ensuring that the liquid cooling lines are properly sealed so as to prevent leakage of the coolant. The last two aspects of the present invention provide the advantage of strain relief and alignment repeatability for the welding torch.

The present invention, together with further objects and advantages, will be best understood by reference to the following detailed description taken in conjunction with the accompanying drawings.

BRIEF DESCRIPTION OF THE DRAWINGS

FIG. 1 is a left side view of a welding torch according to the present invention;

FIG. 2 is a rear view of the welding torch of FIG. 1;

FIG. 3 is a rear cross-sectional view of the welding torch of FIG. 1 without the torch mount;

FIG. 4 is a partial cross-sectional view of the welding torch of FIG. 1 taken along section lines 4—4 of FIG. 3 when the body tube and cable supply adapter of the welding torch are assembled and the input and output coolant connectors are in a sealing position;

FIG. 5 is the partial cross-sectional view of FIG. 4 prior to attachment of the input and output coolant connectors;

FIG. 6 is a cross-sectional view of the welding torch of FIG. 1 taken along section lines 6—6 of FIG. 3 when the body tube and supply cable adapter of the welding torch are assembled;

FIG. 7 is a cross-sectional view of the welding torch of FIG. 1 taken along section lines 7—7 of FIG. 6;

FIG. 8 is an exploded view of the portion of the welding torch of FIG. 6 when the body tube and supply cable adapter of the welding torch are disassembled;

FIG. 9A is an exploded view of a front portion of the welding torch of FIG. 1;

FIG. 9B is an exploded view of a cable assembly for use with the welding torch of FIG. 1; and FIG. 9C is an exploded view of a rear cable connector assembly for use with the welding torch of FIG. 1 and the cable assembly of FIG. 9B.

FIG. 10 is a perspective view of the proximal end of the body tube shown in FIG. 9A.

DETAILED DESCRIPTION OF THE PREFERRED EMBODIMENTS

Referring to the drawings, FIGS. 1 and 9A show a liquid-cooled welding torch assembly 20 for use in robotic welding. The welding torch assembly 20 includes a body tube 22 that has a proximal end 24 and a distal end 26. The body tube 22 defines interior channels that extend from the proximal end 24 to the distal end 26. The interior channels are dimensioned so as to receive power, shielding gas, and a wire electrode (not shown), as well as an input flow of coolant. The coolant, which may be water, is fed from the proximal end 24 to the distal end 26 of the body tube 22 so as to absorb heat generated by the welding torch assembly 20. The heated coolant is then circulated away from the distal end 26 to the proximal end 24 in another channel of the body tube 22. A central bore extends along the axial length of the body tube. The bore is dimensioned for accepting a replaceable liner 29 (FIGS. 8 and 9A). The liner is a hollow conductive material designed to guide and provide good electrical contact to the electrode. The liner 29 may be a JUMP LINER available from DovaTech, Ltd. of Beecher, Ill.

The distal end 26 of the body tube assembly 22 is attached to a nozzle assembly 34. As shown in FIG. 9A, the nozzle assembly 34 includes an insulator 36 that is attached to a gas diffuser 38 which in turn is connected to a contact tip 40 that receives the wire electrode. The insulator 36, the gas diffuser 38 and the contact tip 40 are housed within a nozzle 42 that is connected to the distal end 26 of the body tube 22 by a slip, or slide on, fitting. The body tube 22 is composed of an inner element, made of a conductive metal such as copper, and an outer element, made of a metal such as brass. An insulating element, made of an appropriate material such as high temperature TEFLON, nylon, or other similar material, is disposed between the inner and outer elements. The insulating element prevents electrical current from flowing from the inner element to the outer element. The body tube 22 may be straight or bent to a desired angle for facilitating the welding process. The internal structure of the above described body tube 22, along with the insulator 34, the gas diffuser 36, the contact welding tip 38 and the nozzle 40 are well known structures and available from DovaTech, Ltd. of Beecher, Ill.

The proximal end 24 of the body tube 22 extends through a water block insulator 42 that surrounds the body tube 22 and is attached thereto by a threaded fastener. The water block insulator electrically insulates the outside of the body tube 22. Referring to FIGS. 6 and 7, a water block assembly 43 forms a portion of the body tube 22 that guides the coolant, electrode and shielding gas to the appropriate inner tube 25 and coolant 27 channels in the body tube 22. The water block assembly 43 preferably is brazed to the rest of the body tube 22.

The proximal end 24 of the body tube 22 also includes a hexagonally shaped stop member 44. The proximal end 24 also has a set of male connectors extending from the water block 43 such as an electrode connector 46, a coolant supply connector 48 and a coolant return connector 50 that receive the shielding gas and electrode, a coolant supply and a coolant return, respectively. Each of the connectors 46, 48 and 50 comprise a rigid tube 52 made of a metal such as brass. The electrode connector 46 is preferably longer and wider than the coolant supply and return connectors 48, 50, as shown in FIG. 10 so that the body tube can easily and repeatably connect in a predetermined orientation with the supply cable adapter 74.

The coolant supply connector 48 and the coolant return connector 50 preferably-have the same structure. As shown in FIGS. 4-5, the connectors 48 and 50 each have a body tube connection, such as a threaded external portion 54 formed at the body tube connection end 56 of the rigid tube 52 for releasably connecting the rigid tube 52 within a corresponding threaded passage formed in the water block 43 of the body tube 22. The rigid tubes 52 of the coolant supply connector 48 and the coolant return connector 50 each include a flange 58 adjacent to the threaded external portion 54 and integral with the rigid tube 52. The rigid tubes 52 further include a retaining lip 60 integral with the rigid tube and positioned opposite the body tube connection end 56 of the rigid tube 52, whereby the plurality of axially compressible and radially expandable sealing members 62 are slidably and coaxially disposed about the rigid tube 52 between the flange 58 and the retaining lip 60.

In one embodiment, the sealing members 62 may be composed of a plurality of O-rings or QUAD-rings. In another embodiment, a single sealing member may be used, wherein the axial length of the sealing member is greater than its radial thickness. A length of rubber tubing, such as surgical tubing, may be used as the single sealing member. Each of the sealing members 62 is preferably made of a good sealing material such as rubber. A sealing member retaining ring 63, preferably made from a rigid material such as a plastic, is slidably disposed about the rigid tube between the sealing members 62 and the retaining lip 60.

Referring to FIGS. 1 and 9A, exterior to the water block 43, and axially held between the water block insulator 42 and stop member 44, is a plastic nut 64 that has a notched handle 66 and a cylindrical proximal end 68 that has a threaded insert 70 made of brass. The threaded insert 70 engages the threads 72 of a cylindrically shaped supply cable adapter 74. The proximal end 76 of the supply cable adapter 74 has a set of female connectors, such as three cylindrical channels or passages 80, 82 and 84 that are shaped to receive the three tubes 52 of the connectors 46, 48 and 50, respectively. The three channels 80, 82 and 84 extend from the proximal end 76 to the distal end 86 of the supply cable adapter 74. The diameter of each channel 80, 82, 84 is constant from the proximal end 76 to about midway along the length of the supply cable adapter 74 where the diameter is reduced and a ledge is formed. The channels 80, 82 and 84 extend from the ledge to the distal end 86 of the supply cable adapter 74 in a manner so that they have a constant diameter and a diameter that is reduced in magnitude when compared with the diameter at the proximal end 76 of the supply cable adapter 74. Each of the channels 82 and 84 has a biasing member 88, such as a spring, disposed within the hollow passage defined by the channel and abutting the ledge. Each biasing member 88 is removably attached to the ledge in the hollow passage. In one embodiment, a spring may be attached to a threaded connector 90 that cooperates with threads in the supply cable adapter 74.

Referring to FIGS. 4-5, 6 and 8, the water block 43 portion of the body tube 22 is attached to the supply cable adapter 74 by inserting the electrode connector 46, the coolant supply connector 48 and the coolant return connector 50 into the corresponding channels 80, 82 and 84, respectively. The connectors 48 and 50 engage the springs within the channels 82 and 84, respectively. As the free ends of the connectors 48 and 50 near the ledge within the channels 82 and 84, the sealing member retaining rings 63 are engaged by the springs within the channels. As the sealing member retaining ring 63 on each connector 48 and 50 engages the spring, the axial force of the spring against the sealing member retaining ring 63 is distributed against the sealing members 62 so that they are axially compressed toward the flange 58 on each connector 48, 50. As the sealing members 62 compress, they expand axially so that each sealing member 62 forms a circumferential seal against the inside of the corresponding channel 82, 84. FIGS. 4 and 5 best illustrate the operation of the connection between the water block 43 portion of the body tube 22 and the supply cable adapter 74.

An advantage of this connection is that the sealing members are less likely to be damaged with each disconnection and reconnection because the outer diameter of the sealing members is preferably less than the inner diameter of the channels 82, 84. Also, the multiple seals formed by the plurality of sealing members acts to increase the integrity of the overall seal and provide redundancy in case one or more sealing members become worn or damaged. In another embodiment, the sealing members 62 may be a single sealing member, such as a length of rubber tubing or other compressible material, that can move axially and expand radially to provide a seal. Also, the sealing member retaining ring 63 may be omitted in another embodiment. After the connectors 46, 48 and 50 are fully inserted into the channels, the plastic nut 64 is rotated so as to engage the threads 70 of the nut 64 with the threads 72 formed at the proximal end 76 of the supply cable adapter 74.

The supply cable adapter, as shown in FIGS. 4-5, 6 and 8 includes multiple channels in the distal end 86 that extend from, or merge with, the channels 80, 82, 84 in the proximal end 76. FIGS. 4 and 5 show the extensions of the coolant channels 82, 84 though the distal end 86 of the supply cable adapter 74. Check valves 100 are positioned in each of the coolant channels at the distal end of the adapter 74. The check valves 100 are positioned in each of the coolant channels to prevent excess coolant from spilling out of the supply cable adapter when the body tube 22 is removed from the supply cable adapter 74. The check valves 100 are particularly useful in situations where a source of coolant for the welding torch is positioned at a greater elevation than the welding torch. One suitable check valve 100 is a check valve cartridge available from Kepner Products Company of Villa Park, Ill. Referring to FIGS. 6 and 8, auxiliary gas from auxiliary gas channels 102 in the distal end 86 of the supply cable adapter 74 merge with the electrode channel 80.

At the distal end 86 of the supply cable adapter 74 are a plurality of male connectors removably attached to the supply cable adapter. As shown in FIGS. 1–5, the connectors include an electrode connector 92, a coolant supply connector 94, a coolant return connector 96, and a pair of auxiliary gas connectors 98. The electrode connector 92 is preferably the longest of the connectors and is connected via a set screw or other removable connection to the supply cable adapter 74. Each of the coolant supply and return connectors 94, 96 are preferably of different lengths and are shorter than the electrode connector 92. The coolant supply and return connectors are connectable to the supply cable adapter via threaded connections. The auxiliary gas connectors 98 are preferably shorter than the shortest of the coolant supply and return connectors 94, 96. Other combinations of lengths for these connectors are also contemplated. An advantage of the differing lengths is that they allow greater access for tools during assembly and disassembly. Additionally, the longer, and preferably greater diameter, electrode connector 92 provides extra strain relief to the remainder of the shorter and narrower connectors so that excessive strain placed on the connectors by an attached supply cable assembly is channeled to the stronger electrode connector 92.

In one embodiment, the welding torch assembly 20 can be adapted 20 to be operated by a robot. This is done by inserting a cylindrical mounting cuff 106 over the body of the supply cable adapter 74. The orientation of the mounting cuff 106 is fixed by having a pair of diametrically opposed alignment pins 104 that are attached to the supply cable adapter 74 inserted into corresponding rear notches 108. A sleeve 110 of a torch mount 112 is then slid over the mounting cuff 106 so that an alignment pin 114 is inserted into a notch 116 formed in the rear of the mounting cuff 106. The torch mount 112 has a work surface 118 that extends from the sleeve 110 and is used to be grasped by a robot, or a collision sensor attached to a robot, in a well known manner. Welding robots suitable for use with the presently preferred welding torch assembly 20 are commonly available from manufacturers such as Panasonic, Fanuc and others.

An advantage of the preferred welding torch 20 is that a precise and repeatable orientation the components, culminating in the position of the tip of the welding torch is maintained. The torch mount 112 is repeatably positionable on the mounting cuff 106 through the alignment pin 114 and notch 116. Similarly, the mounting cuff is repeatably positionable on the supply cable adapter 74 through a set of alignment pins 104 and corresponding notches 108 on the mounting cuff. The supply cable adapter 74 also connects to the body tube 22 in a predetermined orientation because of the three male connectors 46, 48, 50 on the water block 43 and the corresponding female connectors 80, 82, 84 in the supply cable adapter 74.

The supply cable adapter 74 also attaches to a cable assembly 120 in a predetermined orientation. As is shown in FIGS. 9A and 9B, a strain relief 122 has two halves 124, 126 each with an alignment tab 128 that corresponds with an alignment tab groove 130 on the supply cable adapter 74. FIGS. 9B and 9C illustrate one preferred cable assembly 120 and rear connector assembly 131. The cable assembly contains a coolant supply line 132 a coolant return line 134, an electrode supply 136 and gas lines 138. The coolant supply and return lines also preferably contain one of more wires carrying power to the welding torch. The shielding gas is used to aid in the welding process. Suitable shielding gases for metal inert gas (MIG) applications are mixtures of $CO_2$ and $O_2$ as well as gas mixes including $CO_2$, $O_2$, Ar, and other inert gas. Although one cable assembly is shown, the cable assembly 120 may be any cable assembly that includes gas, wire electrode, coolant and power. The cable assembly 120 is preferably held in a single flexible sheath 140. The cable assembly attaches to appropriate connectors on the supply cable adapter and is surrounded by the strain relief 122 and a spring 142. A similar strain relief 144 and another spring 142 surround the cable assembly at its connection with the rear connector assembly 131. The various coolant supply and return lines 132, 134, electrode supply 136 and gas line all preferably connect to the rear connector assembly. The rear connector assembly 131 preferably includes a plurality of connectors to manage all the necessary interconnections between the cable assembly 120 and the supply equipment for coolant, power, gas and wire electrode. A coolant block 154 permits coolant to be connected to the cable assembly. A direct plug adapter 150 connects the coolant block to a direct plug 152 to receive power and an electrode.

One suitable direct plug is the BERNARD® feeder disconnect, part number 1199, available from DovaTech, Ltd. of Beecher, Ill. The direct plug adapter 150 permits the welding torch to be used with various combinations of power and electrode supplies from different manufacturers. A liner 156 is inserted in the direct plug 152 to provide a means for transporting the consumable wire electrode from the wire feeder (not shown). A suitable liner is part number 44115 available from DovaTech, Ltd. Liners may be varied in size to match the electrode size and the length of the cable assembly used. Cable assemblies and rear connector assemblies appropriate for use with the presently preferred welding torch are available from DovaTech, Ltd. of Beecher, Ill.

It is contemplated that the present design may also be used in liquid-cooled semi-automatic welding applications to provide for quick changes of the body tube without the need to remove the handle, switch, and other components commonly found in semi-automatic welding torches. Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

We claim:

1. A liquid-cooled welding torch assembly for use in robotic welding, said torch assembly comprising:
    a body tube comprising a set of male connectors, the body tube guiding an electrode, and a flow of coolant to a welding tip; and
    a supply cable adapter comprising a set of female connectors corresponding to the set of male connectors, wherein at least one of the male connectors comprises a rigid tube comprising a plurality of axially compressible and radially expandable sealing members coaxially and slidably disposed about the rigid tube, whereby the plurality of axially compressible and radially expandable sealing members expand to create a seal between the at least one of the male connectors and a corresponding one of the set of female connectors.

2. The welding torch assembly of claim 1, wherein each of the plurality of axially compressible and radially expandable sealing members comprises an O-ring.

3. The welding torch assembly of claim 1, wherein each of the plurality of axially movable and radially expandable sealing members comprises a Quad-ring.

4. The welding torch assembly of claim 1, wherein the set of male connectors comprises an electrode connector and a coolant supply connector that comprises a rigid tube comprising a plurality of axially movable and radially expandable sealing members coaxially disposed about the rigid tube.

5. The welding torch assembly of claim 1, wherein the set of male connectors comprises an electrode connector and a coolant return connector that comprises a rigid tube comprising a plurality of axially movable and radially expandable sealing members coaxially disposed about the rigid tube.

6. The welding torch assembly of claim 4, wherein the set of male connectors further comprises a coolant return connector that comprises a second rigid tube comprising a plurality of axially movable and radially expandable sealing members coaxially disposed about the second rigid tube.

7. The welding torch assembly of claim 4, wherein the rigid tube further comprises a body tube connection end for releasably connecting the rigid tube to the body tube.

8. The welding torch assembly of claim 5, wherein the rigid tube further comprises a body tube connection end for releasably connecting the rigid tube to the body tube.

9. The welding torch assembly of claim 4, wherein the rigid tube comprises:
    a body tube connection end having a threaded external portion;
    a flange adjacent the threaded portion and integral with the rigid tube; and
    a retaining lip integral with the rigid tube and positioned opposite the body tube connection end of the rigid tube, whereby the plurality of axially compressible and radially expandable sealing members are positioned along the rigid tube between the flange and the retaining lip.

10. The welding torch assembly of claim 5, wherein the rigid tube comprises:
    a body tube connection end having a threaded external portion;
    a flange adjacent the threaded portion and integral with the rigid tube; and
    a retaining lip integral with the rigid tube and positioned opposite the body tube connection end of the rigid tube, whereby the plurality of axially compressible and radially expandable sealing members are positioned along the rigid tube between the flange and the retaining lip.

11. The welding torch assembly of claim 9, wherein the coolant supply connector further comprises a sealing member retaining ring for receiving an axial force from a female connector and evenly distributing the axial force against the sealing member.

12. The welding torch assembly of claim 10, wherein the coolant return connector further comprises a sealing member retaining ring for receiving an axial force from a female connector and evenly distributing the axial force against the sealing member.

13. The welding torch assembly of claim 1, wherein at least one of the set of female connectors comprises a hollow passage in the supply cable adapter sized to accept the at least one of the set of male connectors, the at least one of the set of female connectors having a biasing member disposed within the hollow passage for supplying an axial force against the plurality of sealing members, whereby the sealing members compress and expand to form a seal.

14. A liquid-cooled welding torch assembly for use in robotic welding, said torch assembly comprising:
   a body tube comprising a set of male connectors, the body tube guiding an electrode and a flow of coolant to a welding tip; and
   a supply cable adapter comprising a set of female connectors corresponding to the set of male connectors, wherein at least one of the male connectors comprises a rigid tube comprising an axially compressible and radially expandable sealing member coaxially disposed about the rigid tube, the axially compressible and radially expandable sealing member having an axial length and a radial thickness, wherein the axial length is greater than the radial thickness, whereby the axially compressible and radially expandable sealing member creates a seal between the at least one of the male connectors and a corresponding one of the set of female connectors when an axial force is applied to the sealing member.

15. The welding torch assembly of claim 14, wherein the set of male connectors comprises an electrode connector and a coolant supply connector that comprises a rigid tube having an axially compressible and radially expandable sealing member coaxially disposed about the rigid tube.

16. The welding torch assembly of claim 14, wherein the set of male connectors comprises an electrode connector and a coolant return connector that comprises a rigid tube having an axially compressible and radially expandable sealing member coaxially disposed about the rigid tube.

17. The welding torch assembly of claim 15, wherein the set of male connectors further comprises a coolant return connector that comprises a second rigid tube having an axially compressible and radially expandable sealing member coaxially disposed about the second rigid tube.

18. The welding torch assembly of claim 15, wherein the rigid tube further comprises a body tube connection end for releasably connecting the rigid tube to the body tube.

19. The welding torch assembly of claim 16, wherein the rigid tube further comprises a body tube connection end for releasably connecting the rigid tube to the body tube.

20. The welding torch assembly of claim 15, wherein the rigid tube comprises:
   a body tube connection end having a threaded external portion;
   a flange adjacent the threaded portion and integral with the rigid tube; and
   a retaining lip integral with the rigid tube and positioned opposite the body tube connection end of the rigid tube, whereby the axially compressible and radially expandable sealing member is positioned along the rigid tube between the flange and the retaining lip.

21. The welding torch assembly of claim 16, wherein the rigid tube comprises:
   a body tube connection end having a threaded external portion;
   a flange adjacent the threaded portion and integral with the rigid tube; and
   a retaining lip integral with the rigid tube and positioned opposite the body tube connection end of the rigid tube, whereby the axially compressible and radially expandable sealing member is positioned along the rigid tube between the flange and the retaining lip.

22. The welding torch assembly of claim 15, wherein the coolant supply connector further comprise a sealing member retaining ring for receiving an axial force from a female connectors and evenly distributing the axial force against the sealing member.

23. The welding torch assembly of claim 16, wherein the coolant supply connector further comprise a sealing member retaining ring for receiving an axial force from a female connectors and evenly distributing the axial force against the sealing member.

24. The welding torch assembly of claim 14, wherein at least one of the set of female connectors comprises a hollow passage in the supply cable adapter sized to accept the at least one of the set of male connectors, the at least one of the set of female connectors having a biasing member disposed within the hollow passage for supplying an axial force against the plurality of sealing members, whereby the sealing members compress and expand to form a seal.

25. A supply cable adapter for use in a liquid-cooled welding torch, the supply cable adapter comprising:
   an adapter member having an axial length and a width, wherein the axial length is greater than the width;
   a body tube connection end on one end of the adapter member, the body tube connection end comprising a first plurality of female connectors defined by hollow bores in the body tube end of the adapter member;
   a supply end opposite the body tube end, the supply end releasably connectable to a plurality of supply connectors;
   a threaded area adjacent the body tube connection end; and
   a strain relief orientation guide positioned adjacent the supply end of the adapter member.

26. The supply cable adapter of claim 25, wherein each of the plurality of supply connectors having a different axial length.

27. The supply cable adapter of claim 26, wherein said different axial lengths result in a reduction in strain of a cable assembly on the supply connectors.

28. The supply cable adapter of claim 25, wherein the first plurality of female connectors comprises a female coolant supply connector and a female coolant return connector and wherein a biasing member is removably attached inside each of the female coolant supply and return connectors.

29. The supply cable adapter of claim 25, wherein the supply end further comprises a coolant supply channel and a coolant return channel, each of the coolant supply and return channels having a check valve.

30. A liquid-cooled welding torch assembly for use in robotic welding, said torch assembly comprising:
   a body tube having a set of male connectors, the body tube guiding an electrode, and a flow of coolant to a welding tip; and
   a supply cable adapter having a set of female connectors corresponding to the set of male connectors, the supply cable adapter having an axial length and a width wherein the axial length is greater than the width, and wherein the body tube releasably connects to the supply cable adapter in a predetermined rotationally fixed orientation;
   a mounting cuff sized to slidably fit over an exterior portion of the axial length of the supply cable adapter and having an orientation guide adapted to cooperate with a corresponding orientation guide on the supply cable adapter to maintain a predetermined rotationally fixed orientation with respect to the supply cable adapter; and
   a torch mount slidably connectable to an outer portion of the mounting cuff, the torch mount comprising an alignment guide sized to cooperate with a corresponding alignment guide on the mounting cuff to repeatably connect at a predetermined alignment, whereby a repeatable orientation of the body tube is maintained with respect to the torch mount to expedite replacement of the body tube.

* * * * *

UNITED STATES PATENT AND TRADEMARK OFFICE
CERTIFICATE OF CORRECTION

PATENT NO. : 6,078,023

DATED : June 20, 2000

INVENTOR(S) : Glen A. Jones et al.

It is certified that error appears in the above-identified patent and that said Letters Patent is hereby corrected as shown below:

On the Title Page

In column 2, line 4, delete "Specialitis" and substitute --Specialities-- in its place.

In the Claims

In claim 22, line 2, delete "comprise" and substitute --comprises--, and on line 4, delete "connectors" and substitute --connector-- in its place.

In claim 23, line 2, delete "comprise" and substitute --comprises--, and on line 4, delete "connectors" and substitute --connector-- in its place.

In claim 26, line 2, delete "having" and substitute --have-- in its place.

Signed and Sealed this

Twenty-second Day of May, 2001

Attest:

NICHOLAS P. GODICI

Attesting Officer      Acting Director of the United States Patent and Trademark Office